United States Patent [19]
Urkevich

[11] 3,919,438
[45] Nov. 11, 1975

[54] METHOD OF COATING USING A SILICONE MODIFIED POLYESTER

[75] Inventor: M. P. Urkevich, McVille, N.Y.

[73] Assignee: General Electric Company, Waterford, N.Y.

[22] Filed: Nov. 15, 1972

[21] Appl. No.: 306,609

Related U.S. Application Data

[62] Division of Ser. No. 225,300, Feb. 10, 1972.

[52] U.S. Cl. ........ 427/54; 204/159.15; 204/159.19; 260/824; 260/827; 427/44; 428/447; 428/480
[51] Int. Cl.$^2$ .................... B05D 3/06; C08F 267/06
[58] Field of Search ...... 117/93.31, 161 ZA, 161 K; 260/824, 827; 204/159.15, 159.19

[56] References Cited
UNITED STATES PATENTS

| | | | |
|---|---|---|---|
| 3,326,710 | 6/1967 | Brodie | 117/93.31 |
| 3,437,512 | 4/1969 | Burlant et al. | 117/93.31 |
| 3,437,513 | 4/1969 | Burlant et al. | 117/93.31 |
| 3,441,543 | 4/1969 | Heilman | 117/93.31 |
| 3,531,547 | 9/1970 | Hazen et al. | 117/93.31 |
| 3,632,399 | 1/1972 | Burlant et al. | 117/93.31 |
| 3,676,398 | 7/1972 | D'Alelio | 117/93.31 |

*Primary Examiner*—John H. Newsome
*Attorney, Agent, or Firm*—John L. Young, Esq.; E. Phillip Koltos, Esq.; Edward A. Hedman, Esq.

[57] ABSTRACT

The reaction product of a hydroxyl terminated unsaturated polyester of a polycarboxylic acid reactant wherein at least about 65 mole % of the polycarboxylic acid reactant is an $\alpha$, $\beta$-ethylenically unsaturated polycarboxylic acid reactant and an alcohol which contains two terminal hydroxyl groups and allyl ether and/or methallyl ether groups; and an organopolysiloxane containing at least 0.25% by weight of groups reactive with the hydroxyl functional groups of the polyester. The method of preparation and use of such materials are also provided.

6 Claims, No Drawings

METHOD OF COATING USING A SILICONE MODIFIED POLYESTER

This application is a division of application Ser. No. 225,300, filed Feb. 10, 1972.

BACKGROUND OF THE INVENTION

The present invention is concerned with polyesters, their method of preparation, and use thereof. More particularly, the present invention is concerned with silicon-modified polyesters, their method of preparation and use.

Various modified polyesters wherein the polyester is copolymerized with a material reactive with the polyester are known and have been proposed for certain coating applications. Many of these materials, however, are very inadequate in properties important to successful coating operations.

When modifying polyesters with organopolysiloxanes it is particularly difficult to obtain a sufficiently compatible composition to achieve the necessary degree of reaction between the polysiloxane and polyester. In addition, the final properties of such compositions in many instances are very unsatisfactory, particularly with respect to resistance to weathering.

The present invention makes it possible to obtain organosilicon modified polyesters which are highly compatible and which do not require the presence of an auxiliary material in addition to the polyester and organopolysiloxane to achieve such compatibility. In addition, the materials of the present invention are suitable as components in compositions to provide coatings which are quick curing, highly resistant to weathering, and have generally outstanding durability characteristics.

In addition, many of the coatings employing the materials of the present invention are curable by mere exposure to radiation including ultraviolet light, and/or are curable at room temperature with a non-radiation free-radical type curing agent.

SUMMARY OF THE INVENTION

The composition aspect of the present invention is concerned with a polymerizable copolymer comprising the reaction product of:

A. a hydroxyl terminated unsaturated polyester of:
1. a polycarboxylic acid reactant wherein at least about 65 mole % of the polycarboxylic acid reactant is an $\alpha,\beta$-ethylenically unsaturated polycarboxylic acid reactant and up to about 35 mole % of the polycarboxylic acid reactant is a polycarboxylic acid reactant free from non-benzenoid unsaturation; and
2. an alcohol reactant containing two terminal hydroxyl groups and allyl ether groups and/or methallyl ether groups in an amount sufficient to provide at least 0.1 mole of allyl ether groups and/or methallyl ether groups per mole of said ethylenically unsaturated polycarboxylic acid reactant; and
3. wherein said polyester has an acid number from about 10 to about 35; and B. an organopolysiloxane having the average unit formula:

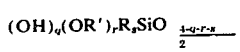

wherein R is lower alkyl radical having 1 to 8 carbon atoms; and/or cycloalkyl radical having 5 to 7 carbon atoms in the ring; and/or lower alkenyl radical having 2 to 8 carbon atoms; and/or mononuclear aryl radical; and/or mononuclear aryl lower alkyl radical having 1 to 6 carbon atoms in the alkyl group; and/or halogenated derivatives of the above radicals; R' is alkyl containing from 1 to 8 carbon atoms per radical; and/or aryl; and/or acyl of 1 to 8 carbon atoms; $s$ has a value of 1 to 2; $q$ has a value of 0 to 1.0; $r$ has a value of 0 to 1.0; and the sum of $q+r$ has a value of 0.01 to 1; and containing at least 0.25% by weight of silicon-bonded OH and/or OR' groups.

The process for preparing these copolymers comprises admixing preformed hydroxyl terminated unsaturated polyester of a polycarboxylic acid reactant wherein at least about 65 mole % of said polycarboxylic acid reactant is an $\alpha,\beta$-ethylenically unsaturated polycarboxylic acid reactant and up to about 35 mole % of said polycarboxylic acid reactant is a polycarboxylic acid reactant free from non-benzenoid unsaturation; and alcohol reactant which contains two terminal hydroxyl groups and allyl ether groups and/or methallyl ether groups in an amount sufficient to provide at least 0.1 mole of allyl ether groups and/or methallyl ether groups per mole of said ethylenically unsaturated polycarboxylic acid reactant; and wherein the polyester has an acid number from about 10 to about 35; with an organopolysiloxane having the average unit formula:

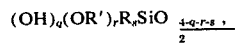

and containing at least 0.25% by weight of silicon-bonded OH and/or OR' groups; and wherein R, R', $q$, $r$, and $s$ have the same meanings as defined above; and a diluent; and reacting the mixture at an elevated temperature for a sufficient time to produce an organopolysiloxane modified polyester.

The copolymers of the present invention are particularly suitable for coating and/or protecting a substrate wherein a composition containing a copolymer of this invention is applied to a substrate and then the coated substrate is subjected to conditions for curing the composition.

DESCRIPTION OF PREFERRED EMBODIMENTS

The polyester employed in the present invention is a hydroxyl terminated unsaturated polymer of a polycarboxylic acid reactant wherein at least about 65 mole % of the polycarboxylic acid reactant is an $\alpha,\beta\beta$-ethylenically unsaturated polycarboxylic acid reactant and up to about 35 mole % of the polycarboxylic acid reactant is polycarboxylic acid reactant free from non-benzenoid unsaturation; and alcohol component which contains two terminal hydroxyl groups and allyl ether and/or methallyl ether groups in an amount sufficient to provide at least 0.1 mole of allyl ether groups and/or methallyl ether groups per mole of the ethylenically unsaturated polycarboxylic acid reactant. In addition, the polyester employed in the present invention has an acid number from about 10 to about 35. The term "polycarboxylic acid reactant" as used herein includes the acid, the anhydrides of the acid, if any, and an ester of the acid.

Illustrative of α,β-ethylenically unsaturated polycarboxylic acid reactants which are suitable for the purposes of the present invention include maleic acid, fumaric acid, itaconic acid, citraconic acid, mesaconic acid, aconitic acid, maleic anhydride and citraconic anhydride. Admixtures of the polycarboxylic acid reactants can be employed, if desired. The preferred unsaturated polycarboxylic acid reactants are di-carboxylic acids or anhydrides thereof with the most preferred being fumaric acid and maleic anhydride.

Examples of suitable polycarboxylic acid reactants free from non-benzenoid unsaturation include isophthalic acid, terephthalic acid, terephthalic anhydride, tetrahydrophthalic acid, tetrahydrophthalic anhydride, chlorophthalic acid, trimellitic acid, trimellitic anhydride, tetracarboxylic reactants such as 1,2,4,5-benzene tetracarboxylic acid; adipic acid, succinic acid, sebacic acid, glutaric acid, nadic anhydride (maleic anhydridecyclopentadiene adduct; chlorindic anhydride; and endomethylene tetrahydrophthalic anhydride. Mixtures of the polycarboxylic acid reactant free from non-benzenoid unsaturation may be used.

At least about 65 mole % and preferably at least about 80 mole % of the polycarboxylic acid reactant of the polyester is the ethylenically unsaturated polycarboxylic acid reactant. Correspondingly, up to about 35 mole % and preferably up to about 20 mole % of the polycarboxylic reactant can be a polycarboxylic acid reactant free from non-benzenoid unsaturation.

The alcohol component of the polyester contains allyl ether and/or methallyl ether groups and terminal hydroxyl radicals. The allyl ether groups and/or methallyl ether groups are present in an amount sufficient to provide at least 0.1 moles of allyl ether groups and/or methallyl ether groups per mole of the ethylenically unsaturated polycarboxylic acid reactant. Generally the maximum amount of allyl ether and/or methallyl ether groups present in the alcohol is such as to provide about 1.3 moles of allyl ether groups and/or methallyl ether groups per mole of the ethylenically unsaturated polycarboxylic acid reactant. Preferably the alcohol contains the allyl ether groups and/or methallyl ether groups in an amount sufficient to provide about 0.3 to about 0.8 mole of allyl ether groups and/or methallyl ether groups per mole of the ethylenically unsaturated polycarboxylic acid reactant.

Some examples of suitable alcohols which contain allyl ether group and two terminal hydroxyl groups include trimethylol propane monoallyl ether; trimethylol ethane monoallyl ether; glycerol monoallyl ether; pentaerythritol diallyl ether; and trimethylol propane monomethallyl ether. Preferably the alcohol contains one allyl ether or methallyl ether group.

In addition to the above-described allyl ether or methallyl ether containing alcohols, this alcohol component of the polyester can and preferably includes a dihydric alcohol such as ethylene glycol; 1,3-propane diol; 1,4-butane glycol; 1,5-pentanediol; neopentylglycol; and polyalkylene glycols such as diethylene glycol and triethylene glycol.

In addition to the above-described components of the polyester, it is contemplated that other known modifying agents such as fatty acids can be employed. Some suitable fatty acids include propionic acid, octanoic acid, capric acid, lauric acid, oleic acid, erucic acid, ricinoleic acid, linoleic acid, linolenic acid, arachidonic acid, caproic acid, caprylic acid, myristic acid, palmitic acid, stearic acid, behenic acid, lignoceric acid, lauroleic acid, myristoleic acid, palmitoleic acid, gadoleic acid, elaeostearic acid, liconic acid, and clupanodonic acid. Also, ethylenically unsaturated monocarboxylic acids can be used in the preparation of the polyesters of the present invention. Examples of such acids include crotonic acid, acrylic acid, and methacrylic acid.

In addition, alcohols having three or more hydroxyl groups as well as monohydric alcohols can be employed in preparing the polyesters used in the present invention. Examples of suitable polyhydric alcohols include trimethylol propane, pentaerythritol, sorbitol, mannitol, glycerol, and trimethylol ethane. Examples of some suitable alcohols containing one hydroxyl radical include ethanol, methanol, cyclohexanol, furfuryl alcohol, and trimethylol propane diallyl ether. When a polyhydric alcohol containing more than two hydroxyl groups is employed, it is preferred to also incorporate a monohydric alcohol in the polyester.

These modifying components can be present in such minor amounts which do not adversely affect the desired properties of the product such as the flow characteristics.

The polyesters employed in preparing the copolymers of the present invention must be hydroxyl terminated and must have an acid number from about 10 to about 35 and preferably from about 15 to about 35. Accordingly the relative quantities of carboxylic reactive groups and hydroxyl groups employed in preparing the polyester are selected so as to achieve the desired acid number as readily determined by those skilled in the art. Usually, the molar excess of alcohol employed with respect to the carboxylic component is a maximum of about 33%. Amounts greater than 33% molar excess provide a copolymer composition which is generally not sufficiently hydrophobic for most potential applications of the compositions.

Methods for preparing the polyester components of the copolymers of the present invention are well known and need not be described herein. The esterification can be conducted either in the absence of presence of a catalyst. In addition, it may be desirable to incorporate an inhibitor during or after the esterification to prevent premature polymerization of the polymer through the unsaturated groups. Some examples of suitable polymerization inhibitors include hydroquinone, resorcinol, tannin, sym-α,β-naphthyl diamine, p-phenylene diamine. The inhibitor when employed is usually present in relatively minor quantities. The amounts are usually less than about 1% by weight based upon the polyester. The preferred quantities are usually between about 0.01% to about 0.1%.

The polyorganosiloxane materials employed in preparing the copolymers of the present invention contain at least 0.25% by weight of groups reactive with the hydroxyl functional groups of the polyester such as silicon-bonded hydroxyl groups; silicon-bonded alkoxy groups; silicon-bonded aryloxy groups; and silicon-bonded acyloxy groups. The polyorganosiloxanes employed in the present invention are polymers containing two or more siloxane units and having the average unit formula:

$$(OH)_q(OR')_rR_sSiO_{\frac{4-q-r-s}{2}}$$

where R is selected from the class comprising lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; R' is a lower alkyl radical containing from 1 to 8 carbon atoms per radical or mononuclear aryl radical or acyl containing from 1 to 8 carbon atoms; $s$ has a value of 1.0 to 2.0 and preferably has a value of 1.05 to 1.45; $q$ has a value of 0 to 1.0 and preferably a value of 0.2 to 0.55; $r$ has a value of 0 to 1.0 and preferably has a value of 0.2 to 0.55 and the sum of $q+r$ has a value of 0.01 and 1.0 and preferably has a value of 0.2 to 0.55.

Examples of siloxane units that can be present in the siloxane resins are $C_6H_5SiO_{3/2}$, $(C_6H_5)_2SiO$, $CH_3SiO_{3/2}$, $(CH_3)_2SiO$, $(CH_3)C_6H_5SiO$, $C_2H_5SiO_{3/2}$, $(C_2H_5)_2SiO$, $(C_2H_5)C_6H_5SiO$, $C_3H_7SiO_{3/2}$, $(C_3H_7)_2SiO$, $(C_3H_7)C_6H_5SiO$, $CH_2=CHSiO_{3/2}$, $(CH_2=CH)CH_3SiO$, $CH_2=CHCH_2SiO_{3/2}$, $(CF_3CH_2CH_2)CH_3SiO$, $ClCH_2CH_2SiO_{3/2}$, $C_6H_{11}SiO_{3/2}$, $Cl_2C_6H_3SiO_{3/2}$, $CF_3C_6H_4SiO_{3/2}$, $(C_6H_5)CF_3CH_2CH_2SiO$, $CH_3C_6H_4SiO_{3/2}$, and $C_6H_5CH_2SiO_{3/2}$.

More specifically, R is selected from the class consisting of lower alkyl radicals, e.g., methyl, ethyl, propyl, butyl, and octyl radicals; cycloalkyl radicals having 5 to 7 carbon atoms in the ring, e.g., cyclopentyl, cyclohexyl, and cycloheptyl radicals; lower alkenyl radicals, e.g., vinyl and allyl radicals; mononuclear aryl, e.g., phenyl, tolyl and xylyl; mononuclear aryl lower alkyl radicals, e.g., benzyl and phenylethyl radicals; and halogenated derivatives of the above radicals, e.g., chloromethyl, beta-chloroethyl, chlorophenyl, dibromophenyl and trifluoromethylethyl radicals. Preferably, R is selected from the class consisting of methyl, ethyl, and phenyl.

The radical, OR', is selected from the class consisting of lower alkoxy radicals having 1 to 8 carbon atoms, e.g., methoxy, ethoxy, propoxy, and isopropoxy radicals; mononuclear aryloxy radicals such as phenoxy and acyloxy radicals having 1 to 8 carbon atoms, e.g., formoxy, acetoxy, and 2-ethylhexoxy. Preferably OR' is a lower alkoxy radical and more preferably is from the group of the methoxy, ethoxy, propoxy, and isopropoxy radicals.

The ratio of the organic substituents, R, to the silicon atoms in the above-described siloxane resin is usually in the range of 1.0:1 to 2.0:1.

In addition, the polysiloxane must contain at least 0.25% by weight of silicon-bonded OH and/or (OR') groups. The polysiloxane can and usually contains a much higher percentage of OH and/or (OR') groups and preferably contains at least 5 weight % of OH groups and/or (OR') groups.

Polysiloxanes which may be used in the practice of the present invention, generally speaking, are well known in the art. For example, see U.S. Pat. No. 2,646,441 of Duane, 3,135,713 of Brewer et al, and U.S. Pat. No. 3,389,114 of Burzynski et al and the discussion therein.

A preferred group of resins suitable for the practice of the present invention are those having an alkoxy content of from about 5 to about 20% by weight. Many of these organosiloxane resins are commercially available and methods for preparing the organopolysiloxane materials are known. For instance, the alkoxy-containing organosiloxanes can be prepared by hydrolyzing and alkoxylating an organochlorosilane in water and an alcohol, and condensing the hydrolyzate to produce the desired organopolysiloxane; or by reacting silicon-tetrachloride with an alcohol.

Another group of preferred polysiloxanes for use in the practice of the present invention are those having a silanol (measured as OH) content of 5 to 7% by weight. The method of making such resins is generally set forth in U.S. patent application, Ser. No. 115,715 of Duane F. Merrill, filed Feb. 16, 1971, entitled "Silanol-Containing Organopolysiloxane Resins and a Method for Making Them" now abandoned.

The relative amounts of unsaturated polyester and organopolysiloxane are generally from about 90 to about 40% by weight of unsaturated polyester and correspondingly from about 10 to about 60% by weight of organopolysiloxane based upon the combined weight of the polyester and organopolysiloxane. The preferred relative quantities of polyester to organopolysiloxane employed in the copolymers of the present invention are from about 70% to about 50% by weight of unsaturated polyester and correspondingly from about 30 to about 50% by weight of organopolysiloxane based upon the combined weight of the polyester and organopolysiloxane. In addition, the best results have been observed when the amounts of reactive hydroxyl material in the polyester and the amount of reactive hydroxyl and/or lithium, and/or aryloxy and or acyloxy radicals of the organosiloxane are substantially balanced so that no hydrolyzable groups in either the polyester or organopolysiloxane remain after the reaction of the two polymers. Such is advantageous since it prevents possible instability of the copolymers due to subsequent hydrolysis upon aging.

It has been found that in order for the polyester and polyorganosiloxane to be compatible and co-reactive over a wide range of conditions such as relative amounts and method preparation, particularly with an aromatic hydrocarbon diluent, the alcohol portion of the polyester must contain allyl ether and/or methallyl ether groups in the specified amounts. In addition, the presence of the allyl ether and/or methallyl ether group aids in promoting the cure of the polyester-polyorganosiloxane copolymers, particularly in the presence of oxygen. The presence of the allyl ether and/or methallyl ether groups are effective in diminishing the retarding effect which oxygen has on the cure of the polyesters. In addition, the increased compatibility aids in extending the longevity of the compositions when exposed to outdoor environmental conditions. Cured coatings obtained from the compositions of the present invention demonstrate good weathering resistance even when exposed to extreme temperature changes. By employing copolymers of the present invention, the probability of the polyorganosiloxane portion of the copolymer exuding to the surface once the composition has been applied to a substrate is greatly diminished, if not prevented altogether.

Generally the polymerizable copolymers of the present invention are admixed with one or more ethylenically unsaturated liquid monomers. Suitable liquid unsaturated monomers include styrene, vinyl toluene, alphamethyl styrene, 2,4-dichloro styrene, paramethyl styrene, vinyl acetate, vinyl chloride, methyl methacrylate, ethyl acrylate, diallyl phthalate, diallyl succinate, diallyl maleate, diallyl ether, butyl methacrylate, allyl acrylate, methallyl alcohol, acrylonitrile, methyl vinyl ketone, allyl crotonate, 1,3-chloroprene, divinyl benzene, triallyl cyanurate, and mixtures thereof. When employed, the unsaturated monomer is present in amounts from about 5 to about 75% by weight of the mixture of unsaturated monomer and copolymer, and preferably from about 20 to about 50% by weight of the mixture of unsaturated monomer and copolymer.

The copolymers of the present invention are prepared by copolymerizing a preformed unsaturated polyester of the type described above with the required polysiloxane to effect a transesterification between the reactants. The ester interchange reaction is carried out in the presence of a reaction diluent which is inert to the reaction (does not adversely affect either the reactants or the product). Suitable reaction diluents include aromatic hydrocarbons such as xylene, benzene, and toluene; and esters such as ethyl acetate and Cellosolve acetate.

The preferred diluents are the aromatic hydrocarbons. The diluent is usually employed in amounts of at least about 1 part by weight per 4 parts of reactants and preferably at least about 1 part by weight per 3 parts of reactants. The maximum quantity of diluent is limited only by economical and practical considerations such as equipment capacities.

In addition it is preferred to carry out the transesterification in the presence of an esterification catalyst. Examples of such catalysts include the metallic esters of the general formula $M(OR^4)_4$ wherein M is a titanium atom or a zirconium atom and each $R^4$ is a monovalent hydrocarbon radical or a acyl radical. The substituents represented by $R^4$ can be alkyl, aryl, alkenyl, aralkyl, alkaryl, and acyl. The $R^4$ substituents can be the same or different in a particular compound. Illustrative of suitable specific catalysts are $M(OC_6H_5)_4$, $M(OC_3H_7)_4$, $M(OC_4H_9)_4$, $M(OC_2H_5)_4$, $M(OC_2H_5)_3(OC_6H_5)$, $M(OCH_3)_3(OC_2H_3)$, $M(OCH_2C_6H_5)_4$, $M(OC_5H_4CH_3)_4$, and $M(OCH_3)(OC_2H_5)(OC_6H_5)(OC_4H_9)$.

The preferred catalysts are the alkyl titanates wherein the alkyl group contains from 1 to 20 carbon atoms; and the titanium acylates. Some commerically available titanium acylates are represented by the formula $(R^5O)_3TiOR^4$ wherein $R^5$ is an alkyl radical or is hydrogen and $R^4$ is an acyl radical. The most preferred transesterification catalyst for the present invention is tetraisopropyltitanate. In addition various known polymeric titanates and zirconates obtained by the partial hydrolysis and condensation of the above-described monomeric titanates or zirconates can be employed.

When the polyorganosiloxane is of the silanol-containing type, the use of a catalyst is not as important as when the polyorganosiloxane contains the other described types of groups which are reactive with the hydroxyl group of the polyester. The esterification is usually carried out at temperatures between about 105° and about 175° C, and preferably between about 120° and about 155° C.

In addition, it has been found that the presence of a material to prevent premature polymerization of the copolymers through the available ethylenically unsaturated bonds is desirable and may be incorporated during the transesterification or shortly thereafter. The presence of such a polymerization inhibitor during the transesterification provides the maximum benefits achieved from that material. Some examples of suitable polymerization inhibitors include hydroquinone, resorcinol, tannin, sym-$\alpha,\beta$-naphthyl diamine, p-phenylene diamine. The inhibitor when employed is usually present in relatively minor quantities. The amounts are usually less than about 1% and preferably between about 0.01 to about 0.1% by weight based upon the combined weight of polyester and polyorganosiloxane.

It has been noted that the presence of a transesterification catalyst such as the tetraisopropyl titanate during the copolymerization accelerates the further curing of the copolymer when exposed to elevated temperatures.

The transesterification reaction is usually carried out under atmospheric pressure. However, higher or lower pressures can be employed if desired. The desired copolymeric product is readily recovered from the reaction mass by such suitable means as acuum distillation to remove the diluent. If extremely pure products are desired, the product can be subjected to conventional purification procedures such as washing, filtration, and recrystallization.

Copolymers of the present invention are curable in the presence of free-radical type catalysts. Illustrative of such catalysts are benzoyl peroxide, lauroyl peroxide, methyl ethyl ketone peroxide, t-butyl hydroperoxide, ascaridole, cumene hydroperoxide, $\alpha,\alpha'$-azobisisobutyronitrile, t-butyl perbenzoate, di-t-butyl diperphthalate, methyl amyl ketone peroxide, and ozonides. Such catalysts may be employed in amounts ranging from about 0.1 to about 2% by weight based on the weight of the copolymer and unsaturated monomer, when present. The curing of the copolymers can be further accelerated by incorporating in the composition in admixture with the catalysts small quantities, such as 0.01 to about 2% by weight of an accelerator based upon the weight of the copolymer and unsaturated monomer, when present. Suitable accelerators include driers such as cobalt naphthanate, cobalt octoate, and cobalt neodecanate; nitrogen-carbon-hydrogen compounds such as azomethine compounds, polyamino compounds containing at least one terminal primary amino group and their aldehyde condensation products.

The preferred copolymers of the present invention when admixed with the unsaturated monomers and the above-described catalysts are curable at room temperature, even when applied as very thick films such as gel coats within a few hours. The catalyst used for room temperature curing is a free-radical catalyst which decomposes at or below room temperature. Of course, this cure time can be significantly reduced if elevated temperatures are employed.

Also, the preferred materials of the present invention are curable by exposure to radiation, including ultraviolet radiation. This is quite advantageous since such compositions can be applied to the desired substrate and cured by mere exposure to the sunlight. The time required for such a cure is primarily dependent upon the thickness of the coating and the intensity and type of radiation and can vary from less than a minute to a few hours. In addition, it may be desirable to include a photosensitizer in the ultraviolet light curable compositions. Such photosensitizers include benzophenone, benzil, benzoin, and methyl benzoin ether. The radiation used to effect curing of the compositions of the present invention can be derived from any suitable source such as for example direct sunlight, high pressure mercury arc quartz ultraviolet lamps, high voltage linear electron accelerator, or a gamma radiation emitter such as cobalt-60.

The compositions of the present invention are particularly applicable as coatings. The compositions of the present invention are particularly useful for coating materials which are to be exposed to outdoor environmental conditions because of their improved durability and weathering characteristics. The compositions of the present invention form extremely secure bonds to such diverse substrates as aluminum, glass, ceramics, wood and plastics. The compositions can be applied to a particular substrate by any of the known convenient methods of coating. For example, the compositions can be applied by dip coating, spray coating, or roll coating. The thickness of the coating will vary depending upon the particular application to which the coated substrate is to be employed. For most outdoor applications coatings between about 1 and 2 mils are desired. The preferred compositions of the present invention are particularly applicable as gel coats.

The compositions of the present invention can be further varied by the incorporation of various extenders or fillers. Illustrative of the many fillers which can be employed with the compositions of this invention are titanium dioxide, liphopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton, synthetic fibers, etc. When fillers are added to the compositions of the present invention, they are generally employed in amounts from about 10 to about 300 parts per filler per part of the copolymer.

In addition, the compositions of the present invention can be modified by the incorporation of various flame retardants, stabilizing agents, and plasticizers. Suitable flame retardants include antimony oxide, various polychlorinated hydrocarbons, and organic sulfonates.

To better understand the present invention the following non-limiting examples are given wherein all parts are by weight unless the contrary is stated.

EXAMPLE 1

To a reaction vessel equipped with a stirrer, a fractionation column packed with glass helices, a Dean-Stark trap, and a condenser are added 213.30 parts of maleic anhydride, 202.74 parts of trimethylolpropane monoalkyl ether, and 183.96 parts of diethylene glycol. The reaction mass is heated under a nitrogen atmosphere to a maximum temperature of 200°C. After about 4½ hours, a total of 33 parts of water of esterification are collected. The reaction mass is cooled to room temperature and about 567 parts of an unsaturated polyester having an acid number of 32 are obtained.

169 parts of this polyester and 60 parts of xylene are added to a reaction vessel equipped with a stirrer, a fractionation column packed with glass helices, a Dean-Stark trap, and a condenser. The reaction mixture is heated to 110° C in about 10 minutes at which time 76 parts of a methoxy chain-stopped linear polysiloxane containing phenyl and methyl groups; 7% by weight silicon-bonded methoxy groups, and a viscosity of 1500–3000 centistokes at 25° C; 25 parts of xylene and 0.38 parts of tetraisopropyl titanate are added to the reaction vessel. The reaction mass is heated under a nitrogen atmosphere to a maximum temperature of 152° C. After about 2½ hours, 6 parts of methanol are collected and external heating of the reaction is stopped. The reaction mass is distilled under vacuum at a pressure of 20 mm Hg to a maximum temperature of 145° C to remove the xylene. About 239 parts of a clear copolymer containing 70 weight % of the unsaturated polyester and 30 weight % of the organopolysiloxane are obtained.

EXAMPLE 2

To a reaction vessel equipped with a stirrer, a fractionation column packed with glass helices, a Dean-Stark trap, and a condenser are added 364 parts of maleic anhydride, 346 parts of trimethylol propane monoallyl ether, and 314 parts of diethylene glycol. The reaction mass is heated under a nitrogen atmosphere to a maximum temperature of 200° C. After about 3 hours, 50 parts of toluene are added to the reaction. After a total time of about 5½ hours, a total of 60 parts of water of esterification are collected. The reaction mass is cooled and then distilled under a vacuum of 28 mm Hg to a maximum temperature of 190° C to remove the toluene. The reaction mass is then cooled to room temperature and about 964 parts of an unsaturated polyester having an acid number of 23 are obtained.

169 parts of this polyester, 76 parts of a methoxy chain-stopped linear polysiloxane containing phenyl and methyl groups, 7% by weight silicon-bonded methoxy groups, and a viscosity of 1500 to 3000 centistokes at 25° C; and 25 parts of xylene are added to a reaction vessel equipped with a stirrer, a fractionation column packed with glass helices, a Dean-Stark trap, and a condenser. The reaction mixture is heated to about 90° C at which time 10 parts of xylene and 0.25 part of tetraisopropyltitanate are added to the reaction vessel. The reaction mass is heated under a nitrogen atmosphere to a maximum temperature of 154° C. After the reaction has proceeded for about three-fourths of an hour, 50 parts of xylene are added to the reaction mixture. After about 4¾ hours, 4.8 parts of methanol are collected and external heating of the reaction is stopped. The reaction mass is distilled under vacuum at a pressure of 25 mm Hg to a maximum temperature of 140° C to remove the xylene. About 240.2 parts of a clear copolymer containing about 70 weight % of the unsaturated polyester and about 30 weight % of the organopolysiloxane are obtained. The clear copolymer is then admixed with 82 parts of styrene and 0.0032 part of hydroquinone.

EXAMPLE 3

140 parts of the same unsaturated polyester as employed in Example 2; 62.7 parts of the same organopolysiloxane as employed in Example 2; and 0.12 part of tetraisopropyltitanate are added to a reaction vessel equipped with a stirrer, a fractionation column packed with glass helices, a Dean-Stark trap, and a condenser. The reaction mass is heated under a nitrogen atmosphere to a maximum temperature of 200° C. After about 1¾ hours a cloudy composition forms which gelled to an unusable material.

A comparison of Example 3 with Example 2 demonstrates the importance of including a suitable reaction diluent in the transesterification to provide the desired products of the present invention.

EXAMPLE 4

To a reaction vessel equipped with a stirrer, a fractionation column packed with glass helices, a Dean-Stark trap, and a condenser are added 217.8 parts of maleic anhydride, 193.8 parts of trimethylol ethane monoallyl ether, and 188.4 parts of diethylene glycol. The reaction mass is heated under a nitrogen atmosphere to a maximum temperature of 202° C. After about 5¼ hours, a total of 37 parts of water of esterification are collected. The reaction mass is cooled to room temperature and about 563 parts of an unsaturated polyester having an acid number of 20 are obtained.

169 parts of this polyester and 100 parts of xylene are introduced to a reaction vessel equipped with a stirrer, a fractionation column packed with glass helices, a Dean-Stark trap, and a condenser. The reaction mixture is heated to 100°C, at which time 81 parts of a methoxy chain-stopped linear polysiloxane containing phenyl and methyl groups, 15% by weight silicon-bonded methoxy groups, and a viscosity of 80 centistokes at 25°C; 10 parts of xylene; and 0.25 part of tetraisopropyltitanate are added to the reaction vessel. The reaction mass is heated under a nitrogen atmosphere to a maximum temperature of 156° C. After about 1¼ hours, 7.8 parts of methanol are collected and external heating of the reaction is stopped. 93 parts of xylene and 6 parts of butyl alcohol are added to the reaction mass to provide a liquid composition having a concentration of 53% by weight of a clear copolymer containing about 70 weight % of the unsaturated polyester and about 30 weight % of the organopolysiloxane.

EXAMPLE 5

To a reaction vessel equipped with a stirrer, a fractionation column packed with glass helices, a Dean-Stark trap, and a condenser are added 426.6 parts of maleic anhydride, 405.8 parts of trimethylol propane monoallyl ether, and 367.92 parts of diethylene glycol. The reaction mass is heated under a nitrogen atmosphere to a maximum temperature of 200° C. After about 4½ hours, a total of 71 parts of water of esterification are collected. The reaction mass is cooled to room temperature and about 1,129 parts of an unsaturated polyester having an acid number of 24.2 are obtained. About 0.17 part of hydroquinone are added to the polyester.

143.8 parts of this polyester and 50 parts of xylene are added to a reaction equipped with a stirrer, a fractionation column packed with glass helices, a Dean-Stark trap, and a condenser. 101.2 parts of a methoxy chain-stopped linear polysiloxane containing phenyl and methyl groups, 7% by weight of silicon-bonded methoxy groups, and a viscosity of 1500 to 3000 centistokes at 25° C, 20 parts of xylene and 0.2 part of tetraisopropyltitanate are added to the reaction vessel. The reaction mass is heated under a nitrogen atmosphere to a maximum temperature of 148° C. After about 2 hours, about 6.5 parts of methanol are collected and external heating of the reaction is stopped. The reaction mass is distilled under vacuum at a pressure of 13 mm Hg to a maximum temperature of 150° C to remove the xylene. About 238.5 parts of a clear copolymer containing 60% of the unsaturated polyester and 40% of the organopolysiloxane are obtained.

EXAMPLE 6

To a reaction vessel equipped with a stirrer, a fractionation column packed with glass helices, a Dean-Stark trap, and a condenser are added 177.85 parts of maleic anhydride, 168.8 parts of trimethylol propane monoallyl ether, and 150.55 parts of 1,5-pentane diol. The reaction mass is heated under a nitrogen atmosphere to a maximum temperature of 203° C. After about 3 hours, 32 parts of water of esterification are collected. The reaction mass is cooled to room temperature and about 465.2 parts of an unsaturated polyester having an acid number of 32 are obtained.

169 parts of this polyester and 60 parts of xylene are added to a reaction vessel equipped with a stirrer, a fractionation column packed with glass helices, a Dean-Stark trap, and a condenser. The reaction mixture is heated to 120° C in about 10 minutes at which time 76 parts of a methoxy chain-stopped linear polysiloxane containing phenyl and methyl groups, 7% by weight silicon-bonded methoxy groups, and a viscosity of 1500 to 3000 centistokes at 25° C; 25 parts of xylene and 0.38 part of tetraisopropyltitanate are added to the reaction vessel. The reaction mass is heated under a nitrogen atmosphere to a maximum temperature of 150° C. After about 4 hours, about 5.8 parts of methanol are collected and external heating of the reaction is stopped. The reaction mass is distilled under vacuum at a pressure of 13 mm Hg to a maximum temperature of 148° C to remove the xylene. About 239.2 parts of a clear copolymer containing 70 weight % of the unsaturated polyester and 30 weight % of the organopolysiloxane are obtained.

EXAMPLE 7

169 parts of the same polyester as employed in Example 5, and 60 parts of xylene are added to a reaction vessel equipped with a stirrer, a fractionation column packed with glass helices, a Dean-Stark trap, and a condenser. The reaction mass is heated to 120° C in about 10 minutes at which time 76 parts of a methoxy chain-stopped linear polysiloxane containing phenyl and methyl groups; 15% by weight silicon-bonded methoxy groups, and a viscosity of 80 centistokes at 25° C, 25 parts of xylene and 0.38 part of tetraisopropyltitanate are added to the reaction vessel. The reaction mass is heated under a nitrogen atmosphere to a maximum temperature of 137°C. After about 1 hour, 4.8 parts of methanol are collected and external heating of the reaction is stopped. A clear solution copolymer of 70% by weight of the unsaturated polyester and 30 weight % of the organopolysiloxane is obtained.

EXAMPLE 8

169 parts of the same unsaturated polyester as employed in Example 4; 101.5 parts of a silanol chain-stopped linear polysiloxane containing phenyl and hexyl groups; 5% by weight silicon-bonded hydroxyl groups, and a viscosity of 500 centistokes at 80% solids in xylene at 25°C; and 25 parts of xylene are added to a reaction vessel equipped with a stirrer, a fractionation column packed with glass helices, a Dean-Stark trap, and a condenser. The reaction mass is heated to a maximum temperature of 160°C. After about 1 hour, an additional 55 parts of xylene are added to the reaction vessel. After a total of about 2½ hours, a total of 3.35 parts of water are collected. The reaction mass which is a clear solution containing about 246.65 parts of a copolymer containing 70 weight % of the unsaturated polyester and 30 weight % of the organopolysiloxane is obtained. An additional 88 parts of xylene are added to the reaction mass and the material is filtered to obtain a very clear product.

COMPARISON EXAMPLE 9

To a reaction vessel equipped with a stirrer, a fractionation column packed with glass helices, a Dean-Stark trap, and a condenser are added 425.2 parts maleic anhydride and 574.8 parts of diethylene glycol. The reaction mass is heated under a nitrogen atmosphere to a maximum temperature of 223° C. After about 8 hours, a total of 71 parts of water of esterification are collected. The reaction mass is cooled to room temperature and about 929 parts of an unsaturated polyester having an acid number of 17 are obtained.

169 parts of this polyester are added to a reaction vessel equipped with a stirrer, a fractionation column packed with glass helices, a Dean-Stark trap, and a condenser. The polyester is heated to 120° C at which time 76 parts of a methoxy chain-stopped linear polysiloxane containing phenyl and methyl groups; 7% by weight silicon-bonded methoxy groups, and a viscosity of 1500 to 3000 centistokes at 25° C; 25 parts of xylene and 0.38 parts of tetraisopropyltitanate are added to the reaction vessel. The reaction mass is heated to a maximum temperature of 148° C during which time an additional 0.1 parts tetraisopropyltitanate and 42 parts of Cellosolve acetate in an attempt to provide a clear solution are added. After about 6½ hours, about 7.4 parts of methanol are collected and external heating of the reaction is stopped. The reaction mass is distilled under vacuum at a pressure of 22 mm Hg to a maximum temperature of 195° C. The product obtained is a cloudy and incompatible polymeric mass which gelled to an unusable state.

COMPARISON EXAMPLE 10

To a reaction vessel equipped with a stirrer, a fractionation column packed with glass helices, a Dean-Stark trap, and a condenser are added 435 parts of maleic anhydride and 565 parts of diethylene glycol. The reaction mass is heated under a nitrogen atmosphere to a maximum temperature of 222° C. After a period of 8.5 hours, a total of 71 parts of water of esterification are collected. The reaction mass is cooled to room temperature and about 929 parts of an unsaturated polyester having an acid number of 21 are obtained.

140 parts of this polyester, 60 parts of the same polysiloxane as employed in Example 1, and 0.4 part of tetraisopropyltitanate are added to a reaction vessel equipped with a stirrer, a fractionation column packed with glass helices, a Dean-Stark trap, and a condenser. The reaction mass is heated under a nitrogen atmosphere to a maximum temperature of 200° C. During the reaction, an additional 0.12 part of tetraisopropyltitanate and 85 parts of Cellosolve acetate are added to the reaction mass. After about 3½ hours, a total of about 13.6 parts of methanol are collected and the reaction mass is cooled to room temperature. A cloudy and incompatible material is obtained which is unsuitable for the purposes of this case.

COMPARISON EXAMPLE 11

Example 10 is repeated except that 85 parts of toluene are added to the reaction instead of the 85 parts of Cellosolve acetate. The results obtained are similar to those of Example 10.

COMPARISON EXAMPLE 12

Example 10 is repeated except that 0.6 parts of tetraisopropyltitanate are employed and 85 parts of xylene are added during the reaction instead of 85 parts of Cellosolve acetate. The reaction in this example is continued for 4 hours. The results obtained are similar to those of Example 10. The product obtained is a cloudy mass which never cleared up.

The following examples illustrate the suitability of the compositions of the present invention for various coating operations.

EXAMPLE 13

Copolymer of the polyester and polyorganosiloxane of Example 1 is admixed with styrene to provide a composition containing 30% by weight styrene and 70% by weight of the copolymer. To this composition are added methyl ethyl ketone peroxide and 0.2% by weight of the composition of a cobalt neodecanoatesolution containing 6% by weight of cobalt metal. The composition is then coated on a wax polished glass substrate at a thickness of about 20 mils. The composition is cured at room temperature for about 2 hours to a slightly tacky state. Two layers of a fiberglass mat impregnated with a conventional commercially available unsaturated polyester containing a peroxide catalyst are applied to the slightly tacky coating. The article is then allowed to cure at room temperature for an additional 3 to 4 hours. The glass panel is then separated from the polyester. The cured article is aged for about a week and then tested in a weatherometer. The results of the weatherometer indicate that the polyester material of the present invention has excellent gloss retention and good color retention and is durable.

EXAMPLE 14

Example 13 is repeated except that the copolymer of the polyester and polyorganosiloxane of Example 1 is replaced with the copolymer of Example 5. Similar results are obtained.

EXAMPLE 15

Copolymer of Example 1 is admixed with styrene to provide a composition containing 30% by weight styrene and 70% by weight copolymer. To this composition is added 1% by weight of methyl benzoin ether. The composition is coated on a glass panel at a thickness of about 1 mil. The coated panel is subjected to radiation from an ultraviolet light lamp for about 1 minute. The coating obtained has excellent mar resistance, good adhesion, is extremely hard and is water white.

The above example is repeated except that the composition is coated in thicknesses of 2 mils and 10 mils. Similar results are obtained.

EXAMPLE 16

The same composition as employed in Example 15 is coated on a glass panel at a thickness of about ½ inch. The coating is then placed under a household sunlamp commercially available from the General Electric Company and cures within 20 minutes. The cured material is water white, hard, excellent mar resistance, and demonstrates good adhesion.

What is claimed is:

1. A method of coating a substrate which comprises applying to said substrate a film, said film comprising (i) a copolymer composition comprising the reaction product of:
   A. a hydroxyl terminated unsaturated polyester of:
      1. polycarboxylic acid reactant wherein at least about 65 mole percent of said polycarboxylic acid reactant is an $\alpha,\beta$-ethylenically unsaturated polycarboxylic reactant and up to about 35 mole percent of said polycarboxylic acid reactant is a polycarboxylic acid reactant free from non-benzenoid unsaturation; and
      2. an alcohol reactant containing two terminal hydroxyl groups and a member selected from the group consisting of allyl ether groups methallyl ether groups and mixtures thereof in an amount sufficient to provide at least 0.1 mole of said ether groups per mole of said ethylenically unsaturated polycarboxylic acid reactant; and
      3. wherein said polyester has an acid number from about 10 to about 35; and
   B. an organopolysiloxane having the average unit formula:

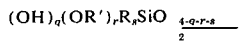

wherein R is selected from the group of lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; R' is selected from the group of alkyl radicals containing 1 to 8 carbon atoms; mononuclear aryl radicals; acyl radicals of 1 to 8 carbon atoms; $s$ has a value of 1.0 to 2.0; $q$ has a value of 0 to 1.0; $r$ has a value of 0 to 1.0; the sum of $q+r$ has a value of 0.01 1.0; and said organopolysiloxane containing at least 0.25% by weight of OH or OR' groups or a mixture of said OH and OR' groups; (ii) an ethylenically unsaturated liquid monomer in an amount from about 5 to about 75% by weight of the mixture of the ethylenically unsaturated liquid monomer and the reaction product; and (iii) a catalytic amount of a free radical type catalyst; and polymerizing the reaction product and the ethylenically unsaturated liquid monomer.

2. A method of coating a substrate which comprises applying to said substrate a film, said film comprising (i) a copolymer composition comprising the reaction product of
   A. a hydroxyl terminated unsaturated polyester of:
      1. polycarboxylic acid reactant wherein at least about 65 mole percent of said polycarboxylic acid reactant is an $\alpha,\beta$-ethylenically unsaturated polycarboxylic reactant and up to about 35 mole percent of said polycarboxylic acid reactant is a polycarboxylic acid reactant free from non-benzenoid unsaturation; and
      2. an alcohol reactant containing two terminal hydroxyl groups and a member selected from the group consisting of allyl ether groups, methallyl ether groups and mixtures thereof in an amount sufficient to provide at least 0.1 mole of said ether groups per mole of said ethylenically unsaturated polycarboxylic acid reactant; and
      3. wherein said polyester has an acid number from about 10 to about 35; and
   B. an organopolysiloxane having the average unit formula:

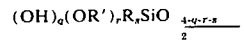

wherein R is selected from the group of lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; R' is selected from the group of alkyl radicals containing 1 to 8 carbon atoms; mononuclear aryl radicals of 1 to 8 carbon atoms; $s$ has a value of 1.0 to 2.0; $q$ has a value of 0 to 1.0; $r$ has a value of 0 to 1.0; the sum of $q+r$ has a value of 0.01 to 1.0; and said organopolysiloxane containing at least 0.25% by weight of OH or OR' groups or a mixture of said OH and OR' groups; (ii) an ethylenically unsaturated liquid monomer in an amount from about 4 to about 75% by weight of the mixture of the ethylenically unsaturated liquid monomer and the reaction product; and polymerizing the reaction product and ethylenically unsaturated liquid monomer upon the substrate with radiation.

3. The process of claim 2 wherein said radiation is ultraviolet light radiation.

4. The process of claim 2 wherein the composition further includes a photosensitizer.

5. A method of coating a substrate which comprises applying to said substrate a film, said film comprising (i) a copolymer composition comprising the reaction product of:
   A. a hydroxyl terminated unsaturated polyester of:
      1. polycarboxylic acid reactant wherein at least about 80 mole percent of said polycarboxylic acid reactant is an $\alpha,\beta$-ethylenically unsaturated polycarboxylic reactant and up to about 20 mole percent of said polycarboxylic acid reactant is a polycarboxylic acid reactant free from non-benzenoid unsaturation; and
      2. an alcohol reactant containing two terminal hydroxyl groups and a member selected from the group consisting of allyl ether groups, methallyl ether groups and mixtures thereof in an amount sufficient to provide at least 0.1 mole of said ether groups per mole of said ethylenically unsaturated polycarboxylic acid reactant; and
      3. wherein said polyester has an acid number from about 10 to about 35; and
   B. an organopolysiloxane having the average unit formula:

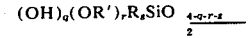

wherein R is selected from the group of lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenated derivatives of the above radicals; R' is selected from the group of alkyl radicals containing 1 to 8 carbon atoms; mononuclear aryl radicals; acyl radicals of 1 to 8 carbon atoms; $s$ has a value of 1.0 to 2.0; $q$ has a value of 0 to 1.0; $r$ has a value of 0 to 1.0; the sum of $q+r$ has a value of 0.01 to 1.0; and containing at least 0.25% by weight of OH or OR' groups or a mixture of said OH and OR' groups; (ii) an ethylenically unsaturated liquid monomer in an amount from about 5 to about 75% by weight of the mixture of the ethylenically unsaturated liquid monomer and the reaction product; and (iii) a catalytic amount of a free radical type catalyst; and polymerizing the reaction product and the ethylenically unsaturated liquid monomer.

6. A method of coating a substrate which comprises applying to said substrate a film, said film comprising (i) a copolymer composition comprising the reaction product of
   A. a hydroxyl terminated unsaturated polyester of:
      1. polycarboxylic acid reactant wherein at least about 80 mole percent of said polycarboxylic acid reactant is an $\alpha,\beta$-ethylenically unsaturated polycarboxylic reactant and up to about 20 mole percent of said polycarboxylic acid reactant is a polycarboxylic acid reactant free from non-benzenoid unsaturation; and
      2. an alcohol reactant containing two terminal hydroxyl groups and a member selected from the group consisting of allyl ether groups, methallyl ether groups and mixtures thereof in an amount sufficient to provide at least 0.1 mole of said ether groups per mole of said ethylenically unsaturated polycarboxylic acid reactant; and an acid number from about 10 to about 35; and
   B. an organopolysiloxane having the average unit formula:

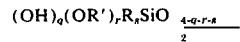

wherein R is selected from the group of lower alkyl radicals having 1 to 8 carbon atoms; cycloalkyl radicals having 5 to 7 carbon atoms in the ring; lower alkenyl radicals having 2 to 8 carbon atoms; mononuclear aryl radicals; mononuclear aryl lower alkyl radicals having 1 to 6 carbon atoms in the alkyl group; and halogenatd derivatives of the above radicals; R' is selected from the group of alkyl radicals containing 1 to 8 carbon atoms; mononuclear aryl radicals of 1 to 8 carbon atoms; $s$ has a value of 1.0 to 2.0; q has a value of 0 to 1.0; $r$ hass a value of 0 to 1.0; the sum of $q+r$ has a value of 0.01 to 1.0; and containing at least 0.25% by weight of OH or OR' groups or a mixture of said OH and OR' groups; (ii) an ethylenically unsaturated liquid monomer in an amount from about 4 to about 75% by weight of the mixture of the ethylenically unsaturated liquid monomer and the reaction product; and polymerizing the reaction product and the ethylenically unsaturated liquid monomer upon the substrate with radiation.

\* \* \* \* \*

UNITED STATES PATENT AND TRADEMARK OFFICE
CERTIFICATE OF CORRECTION

PATENT NO. : 3,919,438
DATED : November 11, 1975
INVENTOR(S) : Michael P. Urkevich It is certified that error appears in the above-identified patent and that said Letters Patent are hereby corrected as shown below:

In Col. 15, line 19, after "groups" and before "methallyl", insert a comma; and on line 44, after "0.01" and before "1.0", insert -- to --.

In Col. 18, on line 20, "halogenatd" should read -- halogenated --; and on line 25, "hass" should read -- has --.

*Signed and Sealed this*

*twenty-third* Day of *March 1976*

[SEAL]

Attest:

RUTH C. MASON
*Attesting Officer*

C. MARSHALL DANN
*Commissioner of Patents and Trademarks*